US012728988B2

(12) United States Patent
Wilson

(10) Patent No.: US 12,728,988 B2
(45) Date of Patent: Sep. 8, 2026

(54) LANDING GEAR ATTACHMENT RIB

(71) Applicant: Airbus Operations Limited, Filton (GB)

(72) Inventor: Fraser Wilson, Filton (GB)

(73) Assignee: Airbus Operations Limited, Filton Bristol (GB)

( * ) Notice: Subject to any disclaimer, the term of this patent is extended or adjusted under 35 U.S.C. 154(b) by 0 days.

(21) Appl. No.: 19/198,293

(22) Filed: May 5, 2025

(65) Prior Publication Data

US 2025/0368323 A1 Dec. 4, 2025

(30) Foreign Application Priority Data

May 31, 2024 (GB) ..................................... 2407750

(51) Int. Cl.
*B64C 25/02* (2006.01)
*B64F 5/10* (2017.01)

(52) U.S. Cl.
CPC ................ *B64C 25/02* (2013.01); *B64F 5/10* (2017.01)

(58) Field of Classification Search
CPC ................................ B64C 25/00; F16M 13/02
See application file for complete search history.

(56) References Cited

U.S. PATENT DOCUMENTS

| | | | |
|---|---|---|---|
| 11,708,145 B2 | 7/2023 | Older | |
| 2006/0180705 A1 | 8/2006 | Nansen et al. | |
| 2007/0128463 A1 | 6/2007 | Dixon et al. | |
| 2022/0170499 A1* | 6/2022 | Wilson | B64C 25/001 |

FOREIGN PATENT DOCUMENTS

| | | | |
|---|---|---|---|
| GB | 2582159 A * | 9/2020 | B64C 1/00 |

OTHER PUBLICATIONS

United Kingdom Search Report for corresponding United Kingdom Patent Application No. 2407750.5 dated Oct. 10, 2024.

V. Irick, Ph.D et al., "Metallic Prepregs for the Composites Industry" Touchsone Research Laboratory, Triadelphia, WV, USA; 14 pages.

* cited by examiner

*Primary Examiner* — Ashesh Dangol
(74) *Attorney, Agent, or Firm* — Greer, Burns & Crain, Ltd.

(57) ABSTRACT

A landing gear attachment member for an aircraft is provided, the landing gear attachment member including a body comprising metal; and a lug comprising a metal matrix composite, wherein the lug is fused to the body via a joint. The lug may be brazed to the body, and the joint may comprise one or more scarf joints.

11 Claims, 5 Drawing Sheets

LANDING GEAR ATTACHMENT RIB

CROSS-REFERENCES TO RELATED APPLICATIONS

This application claims the benefit of Great Britain Patent Application Number 2407750.5 filed on May 31, 2024, the entire disclosures of which are incorporated herein by way of reference.

BACKGROUND OF THE INVENTION

The present disclosure relates to a landing gear attachment member for an aircraft.

The present disclosure also concerns a method of manufacturing a landing gear attachment member for an aircraft, an aircraft comprising a landing gear attachment member and an aircraft wing comprising a landing gear attachment member.

Aircraft landing gear systems are typically attached to the aircraft via a landing gear attachment member. Such a member may extend across the chord of the wing, and comprise at least one lug for attaching the member to the landing gear. The member, and particularly the at least one lug, is subject to substantial loads transferred between the landing gear and the aircraft during take-off and landing, and consequently needs to be strong and resistant to mechanical fatigue. It is also desirable for the member to be lightweight, to maximize the efficiency of the aircraft. Traditional landing gear members have typically been manufactured using materials such as aluminum alloys, alloyed steels and titanium. Of these materials, titanium is particularly desirable as it offers an advantageous balance of strength and weight. However, titanium is expensive and can require extensive extraction energy.

Metal matrix composites (MMCs) are engineered materials comprising a metal matrix reinforced with high-strength longitudinal elements or particles. Metal matrix composites exhibit exceptional strength-to-weight ratios, enhanced fatigue resistance, and improved thermal stability, making them ideal candidates for aerospace applications where weight reduction and performance optimization are paramount. However, metal matrix composites can be more expensive and more difficult to manufacture than conventional metal alloys.

It is desirable to manufacture a landing gear attachment member incorporating metal matrix composite at locations where substantial loads are transferred, and conventional metal alloys on the body of the member.

GB2582159A discloses a load-transferring component comprising a metal matrix composite. The component is attached to adjacent structures via conventional fasteners.

The present invention seeks to mitigate one or more of the above-mentioned problems. Alternatively or additionally, the present invention seeks to provide an improved landing gear attachment member for an aircraft.

SUMMARY OF THE INVENTION

The present invention provides, according to a first aspect, a landing gear attachment member for an aircraft. It may be that the landing gear attachment member comprises a body comprising metal and a lug comprising a metal matrix composite. It may be that the lug is fused to the body via a joint.

Fusing the lug to the body via a joint may dispense with the requirement for conventional fasteners. It has also been found that fusing the lug to the body via a joint may provide a structurally resilient means of attachment between the lug and the body, thereby providing a landing gear attachment member that is remarkably damage tolerant. A lug comprising metal matrix composite may have a similar strength to titanium, a similar density to aluminum and/or a similar fatigue endurance to steel. The metal matrix composite may be crack arresting, thereby ensuring that the lug, and consequently the member as a whole, are resistant to mechanical fatigue, for example due to loads transferred between landing gear and an aircraft.

The landing gear attachment member may be provided in the form of a landing gear attachment fitting. The landing gear attachment member may be a landing gear beam. The landing gear attachment member may form an element of the structure of an aircraft wing. The landing gear attachment member may be attached to a main spar, for example being directly attached thereto. The landing gear attachment member, for example an outer edge thereof, may incorporate a typical airfoil shape of the wing. Alternatively or additionally, the landing gear attachment member may be a landing gear rib. The landing gear rib may serve as an intermediate connecting member between an aircraft wing, for example a spar of an aircraft wing, and an aircraft landing gear. The landing gear rib may extend between two spars. Alternatively, the landing gear rib may be directly connected to only one spar. The body of the landing gear attachment member may comprise the majority of the member, not including the lug. The metal of the body may be a metal alloy. The lug may be a projecting piece or extension on the body that serves as an attachment point for connecting purposes, i.e., for connecting the member to landing gear. The lug may comprise an aperture for accommodating a bolt, screw, pin and/or other fastener. The lug may be small compared to the body, and thus may constitute a small proportion of the member. The member may comprise a plurality of lugs. The portion of the landing gear attachment member that forms the lug(s) may account for less than 10% by weight of the member. The amount of the landing gear attachment member comprising metal matrix composite material may be less than 10% by weight of the member. At least one or each of the plurality of lugs may comprise a metal matrix composite and be fused to the body via a joint, depending on the mechanical requirements of each lug. The metal matrix composite may be a metallic matrix, for example a metallic alloy matrix (for example an aluminum alloy—e.g., a heat treatable aluminum alloy suitable for aerospace applications, such as one from the 2XXX, 6XXX and 7XXX series of alloys), combined with dispersed secondary phases, for example ceramic fibers or particles. The metallic matrix may provide structural and bulk properties. The embedded secondary phases may contribute to increased strength, stiffness and/or impeding crack propagation. The joint may comprise a part or the whole of an interface between the body and the lug. The joint may comprise planar portions, for example extending across a plane parallel to an interface between the body and the lug. Fused may mean bonded to form a single structural component, for example, without the use of conventional fasteners. Fused may comprise brazed, adhered, joined and/or soldered.

It may be that the joint is a brazed joint. A brazed joint may facilitate the fusing of the metal to the metal matrix composite in a way that provides satisfactory joint strength.

It may be that the brazed joint comprises a brazing material located between the body and the lug, the brazing material being different from the metal of the body and the metal matrix composite of the lug. The brazing material may be an aluminum-based brazing alloy. The brazing material may comprise silicon, magnesium, copper, nickel, tin, silver and/or titanium. The selection of brazing material may depend on the specific compositions of the metal and the metal matrix composite. The brazing material may penetrate within the molecular structure of the body and the lug.

It may be that the body is formed from aluminum alloy. The body may be formed from wrought forged aluminum alloy.

It may be that the lug is formed from aluminum metal matrix composite.

It may be that the body is formed from homogenous aluminum alloy. Homogenous may mean that the body is monolithic, and/or that the body does not contain secondary phases, for example ceramic fibers or particles. In this way, the body may be inexpensive and/or straightforward to manufacture.

It may be that the joint comprises a scarf joint. The scarf joint may comprise one or more portions of adjacent ends of the body and the lug that are cut at complementary oblique angles to create a larger overlapping area than would otherwise be created with a perpendicular joint. In other words, the scarf joint may comprise angled tapering portions of the body and the lug in one or more planes. In this way, the contact area between the lug, the body and the brazing material may be maximized, thereby providing a joint with optimal strength. Tapering portions of the body and the lug may enable optimal transfer of loads therebetween, thereby reducing joint stiffness and providing substantially constant strain across the scarf joint. A scarf joint may facilitate an even distribution of strain in the brazing material.

It may be that the scarf joint comprises a projection on the lug and a recess on the body, the projection received within the recess. The scarf joint may have a triangular profile, formed by complementary angled tapering portions of the body and the lug.

It may be that the body comprises a hole adjacent to a tip of the projection on the lug. In this way, a uniform stress distribution may be provided at the tip. A scarf joint without such a hole may have a stress concentration adjacent to the tip, thereby leading to a localized increase in stress at the tip. The hole may therefore be referred to as a stress-relieving hole. The tip of the projection on the lug may have an internal angle of less than 90 degrees, optionally less than 60 degrees, for example less than 40 degrees.

It may be that the metal matrix composite comprises one or more reinforcing elements. For example, it may be that the metal matrix composite is of a type that has a metal matrix phase in which the one or more reinforcing elements are embedded as a secondary phase, thus forming the metal matrix composite. A reinforcing element may have longitudinal dimensions, for example in the form of a fiber, wire, tape and/or thread. Multiple reinforcing elements may be arranged in the metal matrix phase in alignment with adjacent reinforcing elements. The metal matrix composite may be a long fiber metal matrix composite, for example a long fiber aluminum metal matrix composite. The one or more reinforcing elements may be arranged around an aperture on the lug, for example in one or more loops. Portions of the lug adjacent to the aperture may be the most highly loaded portions of the lug, and therefore arrangement of the one or more reinforcing elements around the aperture may provide advantageous resistance to mechanical fatigue resulting from such high loads.

It may be that the one or more reinforcing elements extend to the joint. For example, the one or more reinforcing elements may extend to a portion of the lug adjacent to the joint, or to the joint itself. In this way, the lug may be configured to effectively transfer load across the joint to the body.

It may be that the one or more reinforcing elements extend to the tip of the projection on the lug. In this way, the load path along the one or more reinforcing elements may be substantially continuous across the scarf joint, thereby optimizing the strength of the joint as a whole.

It may be that the one or more reinforcing elements are non-metallic fibers such as for example ceramic fibers (such as silicon carbide for example), glass fibers or carbon fibers, although ceramic fibers are preferred.

It may be that the one or more reinforcing elements are alumina fibers. Alumina fibers may mean high-strength ceramic fibers made partially or entirely from aluminum oxide. Alumina fibers may exhibit advantageous tensile strength, stiffness, thermal and chemical resistance and/or the ability to be incorporated into the metal matrix composite.

It may be that the metal matrix composite has a density of between 2.5 $kgm^{-3}$ and 3.5 $kgm^{-3}$, optionally between 2.8 $kgm^{-3}$ and 3.2 $kgm^{-3}$.

It may be that the joint comprises a plurality of scarf joints. For example, the joint may comprise two scarf joints. Where the lug comprises an aperture, a first scarf joint may be associated with a first end of the aperture, and a second scarf joint may be associated with a second end of the aperture. A portion of the joint adjacent to a center of the aperture may be planar, and may be arranged between the first and second scarf joints. In this way, the lug may resemble a tooth with two roots extending into the body, each root defined by a scarf joint.

According to a second aspect of the invention there is provided a method of manufacturing a landing gear attachment member for an aircraft, the landing gear attachment member comprising: a body comprising metal; and a lug comprising a metal matrix composite, the method comprising attaching the lug to the body via brazing. Brazing may comprise preparing the joint surfaces using chemical and/or mechanical cleaning methods, and may involve the application of flux to the joint to prevent oxidation of the base metals. Brazing may comprise heating the joint to a temperature sufficient to melt a brazing material without melting the metal of the body and the metal matrix composite of the lug. The brazing material may then be applied at the joint, and capillary action may draw the brazing material into the joint. The joint may then be allowed to cool to form a strong metallurgical bond between the body and the lug.

It may be that attaching the lug to the body comprises vacuum brazing. Vacuum brazing may be defined as brazing within a controlled environment with low pressure (typically below atmospheric pressure). In this way, air exposure during brazing may be reduced or eliminated, thereby preventing oxidation during heating and providing a high-quality brazed joint.

It may be that the body is formed from wrought aluminum.

It may be that the lug is formed from aluminum metal matrix composite.

It may be that attaching the lug to the body forms a scarf joint between the lug and the body.

It may be that the method further comprises forming a hole in the body, the hole arranged adjacent to a tip of a projection on the lug at the scarf joint.

It may be that attaching the lug to the body forms two scarf joints between the lug and the body.

The method may include making the lug from multiple layers of metal matrix composite material, for example by laying up multiple separate layers of unbonded metal matrix composite material and then performing a process (e.g., welding, brazing or otherwise bonding the layers together—in a process that may be seen as analogous to those used in other composite material manufacturing processes that use "prepreg" material). The multiple separate layers of unbonded metal matrix composite material may be in the form of continuous fiber reinforced metallic prepreg material. The method may include using a lug that has been made from such multiple layers of metal matrix composite material, which may have been made by a separate entity or in a separate location.

The method may include making the lug, and/or making the above-mentioned multiple layers of metal matrix composite material, by arranging elongate reinforcing elements in a predetermined configuration; introducing a metal material around the reinforcing elements such that the metal material at least partially surrounds the reinforcing elements; and then solidifying the metal material or otherwise causing the elongate reinforcing elements to be embedded within the metal material, such that the metal material forms the metal matrix.

According to a third aspect of the invention there is provided a method according to the second aspect, comprising manufacturing the landing gear attachment member of the first aspect.

According to a fourth aspect of the invention there is provided an aircraft comprising the landing gear attachment member of the first aspect. It may be that the aircraft comprises a plurality of landing gear attachment members, for example two landing gear attachment members, optionally four landing gear attachment members.

The aircraft may be a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and optionally more than 75 passengers. The aircraft may be a commercial aircraft, for example a commercial passenger aircraft, for example a single aisle or twin aisle aircraft. The aircraft need not be configured for carrying passengers, but could, for example, be an aircraft of an equivalent size configured for cargo and/or used on a non-commercial basis. The aircraft may have a maximum take-off weight (MTOW) of at least 20 tons, optionally at least 40 tons, and possibly 50 tons or more. The aircraft may have an operating empty weight of at least 20 tons, optionally at least 30 tons, and possibly about 40 tons or more.

The landing gear attachment member may have a mass of at least 50 kg, optionally at least 100 kg, optionally at least 200 kg and possibly 500 kg or more. The landing gear attachment member may have a length of at least 3 m, optionally at least 5 m and possibly 6 m or more.

According to a fifth aspect of the invention there is provided an aircraft wing comprising the landing gear attachment member of the first aspect.

It may be that the aircraft wing comprises landing gear attached to the landing gear attachment member.

According to a sixth aspect of the invention there is provided a landing gear attachment member for an aircraft. The landing gear attachment member may comprise: a first metal portion comprising a body having an upper surface (e.g., for supporting the upper wing surface—e.g., in the form of a flange) and a lower surface (e.g., for supporting the lower wing surface—e.g., in the form of a flange) and a web extending between the upper surface and the lower surface. The landing gear attachment member may comprise a second metal portion comprising one or more lugs, each defining a hole configured to facilitate rotational attachment of a landing gear thereto (e.g., receiving a pintle). It may be that the first metal portion is joined to the second metal portion via one or more (e.g., brazed) scarf joints.

It will of course be appreciated that features described in relation to one aspect of the present invention may be incorporated into other aspects of the present invention. For example, the method of the invention may incorporate any of the features described with reference to the apparatus of the invention and vice versa.

BRIEF DESCRIPTION OF THE DRAWINGS

Embodiments of the present invention will now be described by way of example only with reference to the accompanying schematic drawings of which.

DETAILED DESCRIPTION OF THE PREFERRED EMBODIMENTS

Figure 1:
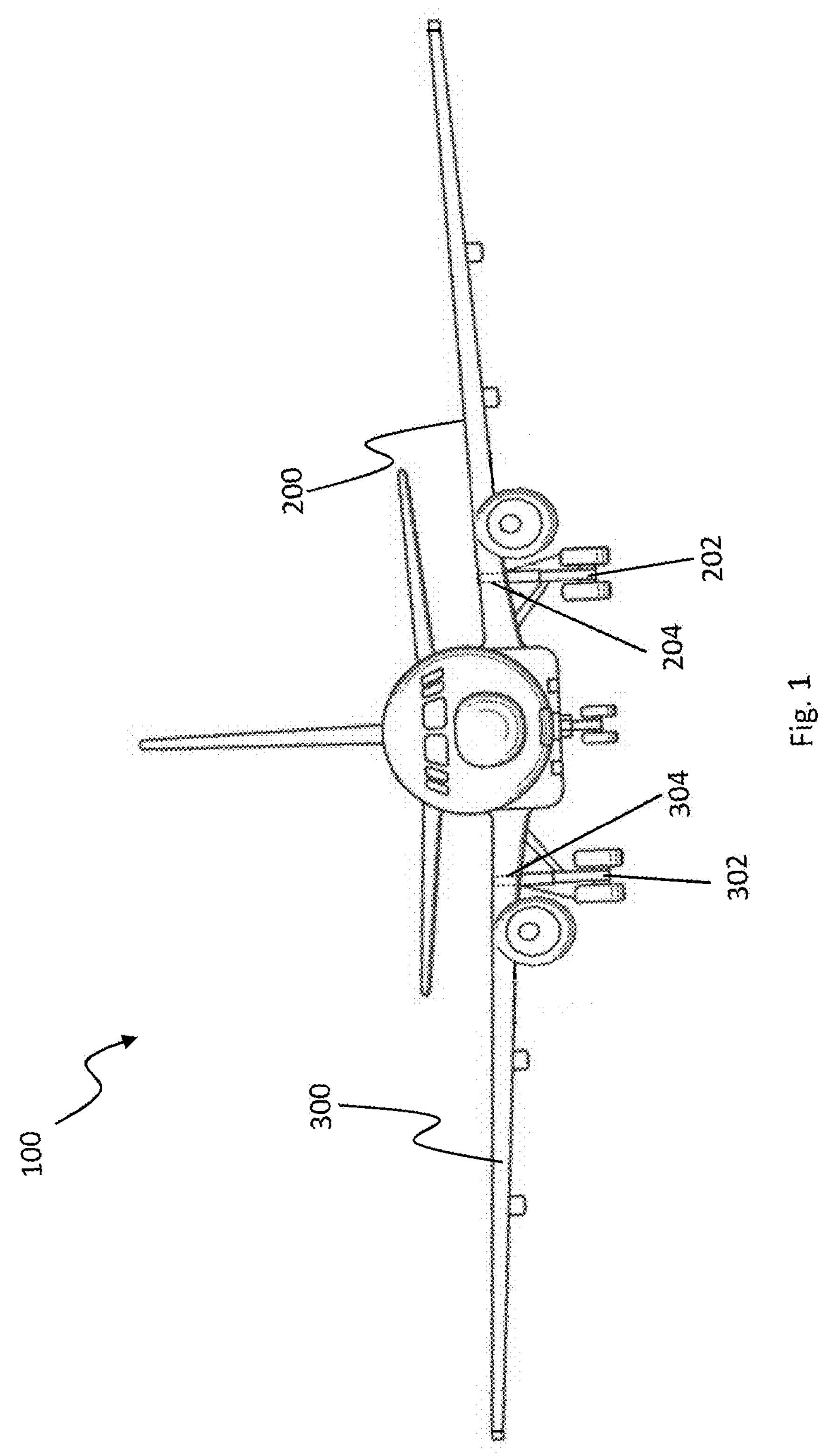
FIG. 1 shows a front-on view of a known aircraft.

An example of a known aircraft is shown in FIG. 1. The aircraft is denoted generally by reference numeral 100 and comprises two aircraft wings 200, 300. The aircraft 100 has a landing gear system 202, 302 attached to each wing, where each landing gear system 202, 302 is shown extending downwards from the respective wing. At a spanwise location where each landing gear system 202, 302 connects to the respective wing, a landing gear attachment member 204, 304 is shown in broken lines, to indicate its location within the outer structure of the wing. While one landing gear attachment member 204, 304 is shown on each wing, it will be appreciated that there may be other members used to attach the landing gear systems 202, 302 to the wings 200, 300.

Figure 2:
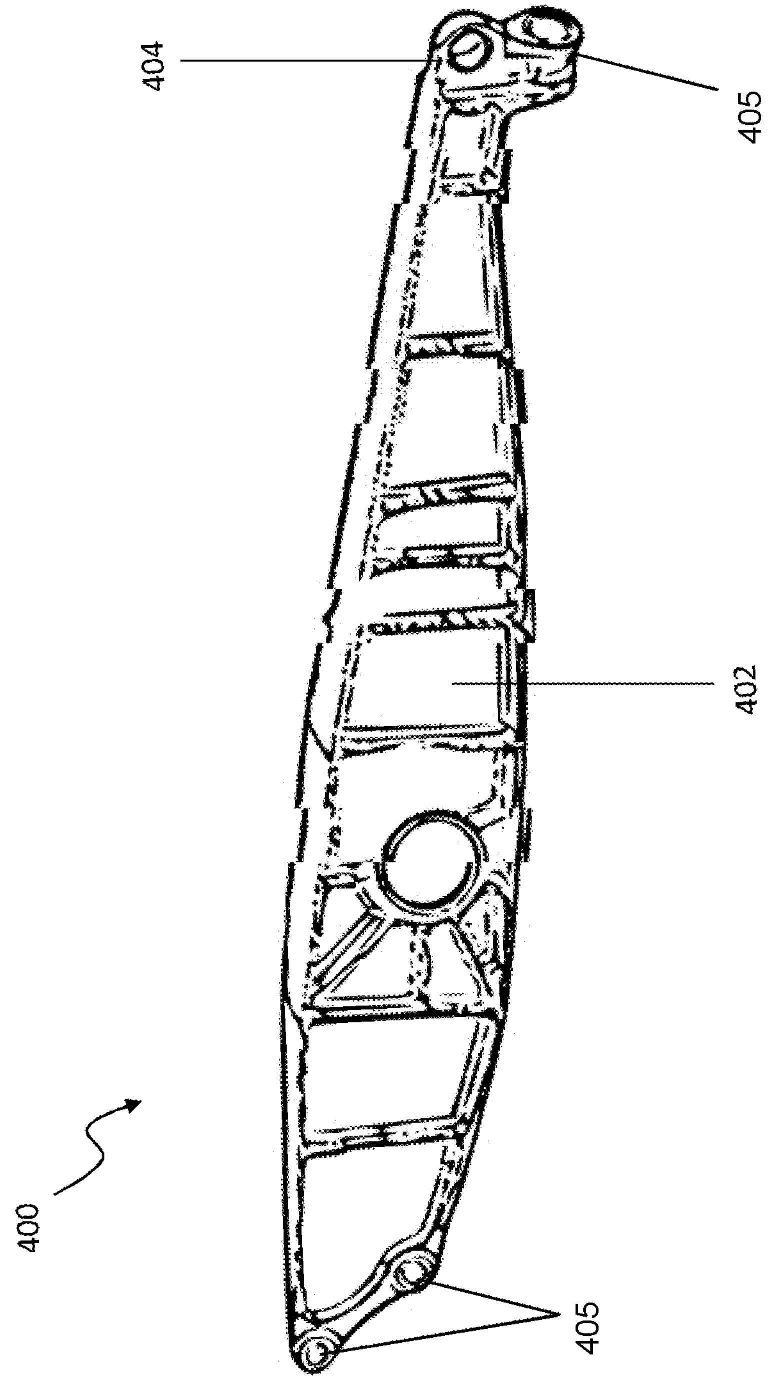
FIG. 2 shows a perspective view of a landing gear attachment member.

FIG. 2 shows a landing gear attachment member 400. The landing gear attachment member 400 is a landing gear beam. The landing gear attachment member 400 has a substantially longitudinal shape, with an outer profile that partially mirrors the camber of the wing, since the member 400 is arranged to extend in a chordwise direction when placed within the wing structure. The member 400 has a body 402, and a lug 404 on the right-hand side. The lug 404 is an extension of the body 402, and projects from the body 402. The lug 404 comprises an aperture therethrough, which may be used to connect the lug 404, and therefore the member 400 as a whole, to a landing gear system like the ones shown in the previous figures. The landing gear attachment member 400 comprises additional lugs 405, which may or may not be integrally formed with the member 400. The landing gear attachment member 400 has a mass of over 100 Kg (on the order of half a ton).

Figure 3:
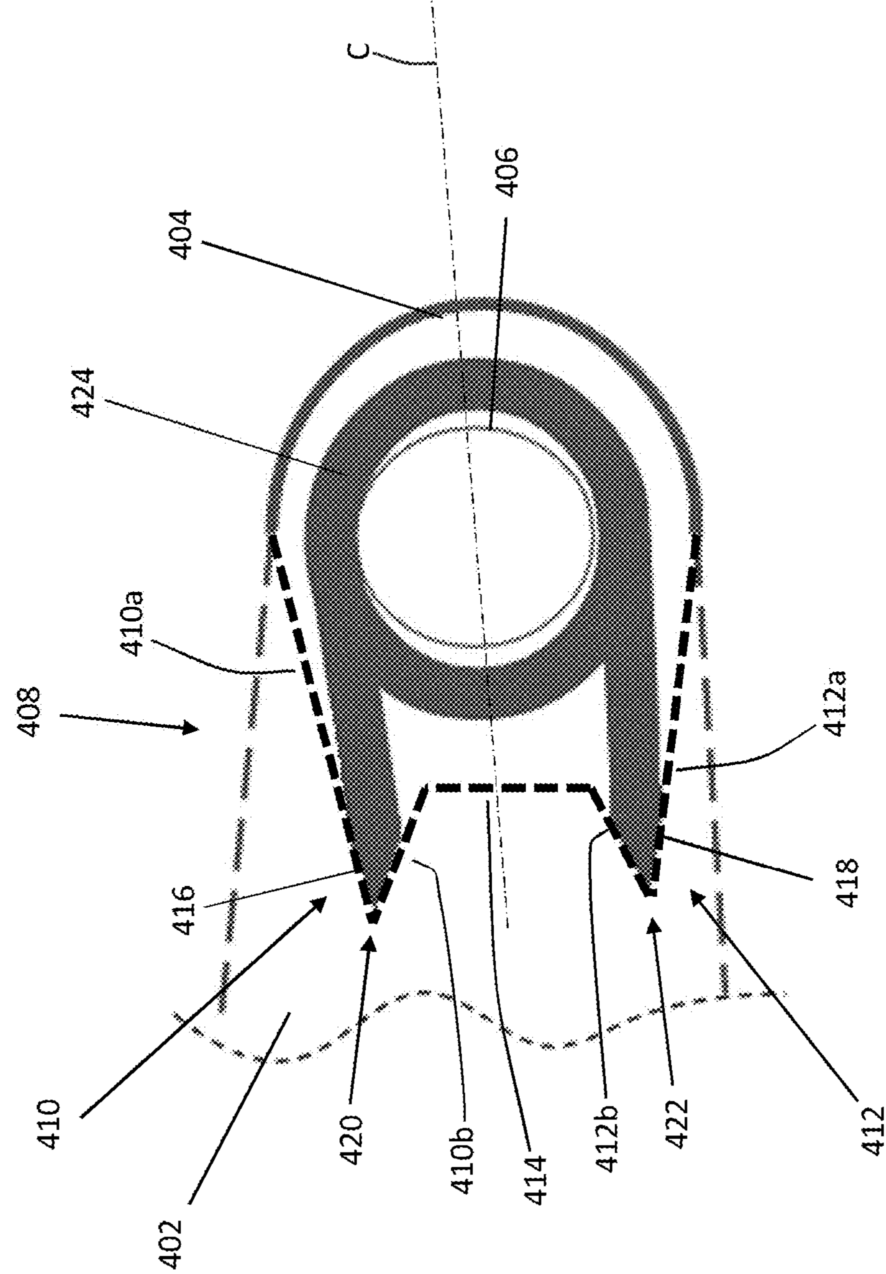
FIG. 3 shows a close-up schematic view of the landing gear attachment member of FIG. 2.

FIG. 3 shows a cross-sectional schematic view of lug 404 and its means of attachment to the body 402. A right-hand edge of the lug 404 has a semi-circular shape, and is shown in a solid line on the right-hand side of the drawing. The lug 404 has an aperture 406 adjacent to its center, the aperture

406 being substantially circular and shown in a relatively thin solid line. A portion of the body 402 is shown on the left-hand side of the drawing, extending away from the lug 404 and bounded by thin broken lines to indicate that it extends further than the bounds of the drawing. The body is formed of wrought forged aluminum.

A brazed joint 408 is located between the lug 404 and the body 402, and is shown in relatively thick broken lines. The joint 408 comprises two scarf joints 410, 412 (which are substantially triangular in shape), and a substantially vertical planar joint 414 between the scarf joints 410, 412 aligned with the vertical center of the aperture 406. Scarf joint 410 has an outermost boundary (straight line 410*a*) and an innermost boundary (straight line 410*b*) and scarf joint 412 has an outermost boundary (straight line 412*a*) and an innermost boundary (straight line 412*b*). The outermost (i.e., top and bottom) boundaries 410*a*, 412*a* of each scarf joint 410, 412 are substantially straight, and extend from the right-hand semi-circular edge of the lug 404 at oblique angles. In this way, the outermost boundaries 410*a*, 412*a* of the scarf joints 410, 412 taper towards each other and towards the center line C of the lug 404 as they extend from right to left. The innermost boundaries 410*b*, 412*b* each extend from left to right at an oblique angle (mirroring the respective outermost boundaries 410*a*, 412*a*) towards the center line C of the lug 404 and terminate at the top and bottom of the planar joint 414 respectively. It will be seen that each scarf joint 410, 412 thus has a respective projection 416, 418 which is substantially triangular in shape, formed by the respective outermost boundaries 410*a*, 412*a* and the respective innermost boundaries 410*b*, 412*b*. Each triangular projection 416, 418 extends leftwards past the planar joint 414 and is received within a complementary recess 420, 422 on the body. In this way, the outer profile of the lug 404 resembles a tooth with a rounded crown, and two substantially triangular roots received within the body 402. It will be appreciated that the lug 404 may also be attached to another form of landing gear attachment member in a similar way, for example to a landing gear attachment rib.

The lug 404 comprises a metal matrix composite region 424 which is shown in FIG. 3 as a solid shaded area. The metal matrix composite region 424 comprises Aluminum oxide ceramic fibers (alumina fibers) embedded in an Aluminum alloy matrix. The metal matrix composite region 424 loops around the aperture 406 in a circular fashion, and has two straight protrusions extending into the projections 416, 418 of each scarf joint 410, 412. It will be appreciated that there may be a plurality of elements forming the metal matrix composite region which are overlaid on one another in any particular plane and that there may be regions in which adjacent fibers are aligned. For example, at least some of the fibers may be circumferentially aligned with the circumference of the aperture 406. It may be that there are a plurality of loops of layers of metal matrix composite material around the aperture, the number of loops depending, for example, on the magnitude of the load to be transferred between the lug 404 and the body 402.

Figure 4:
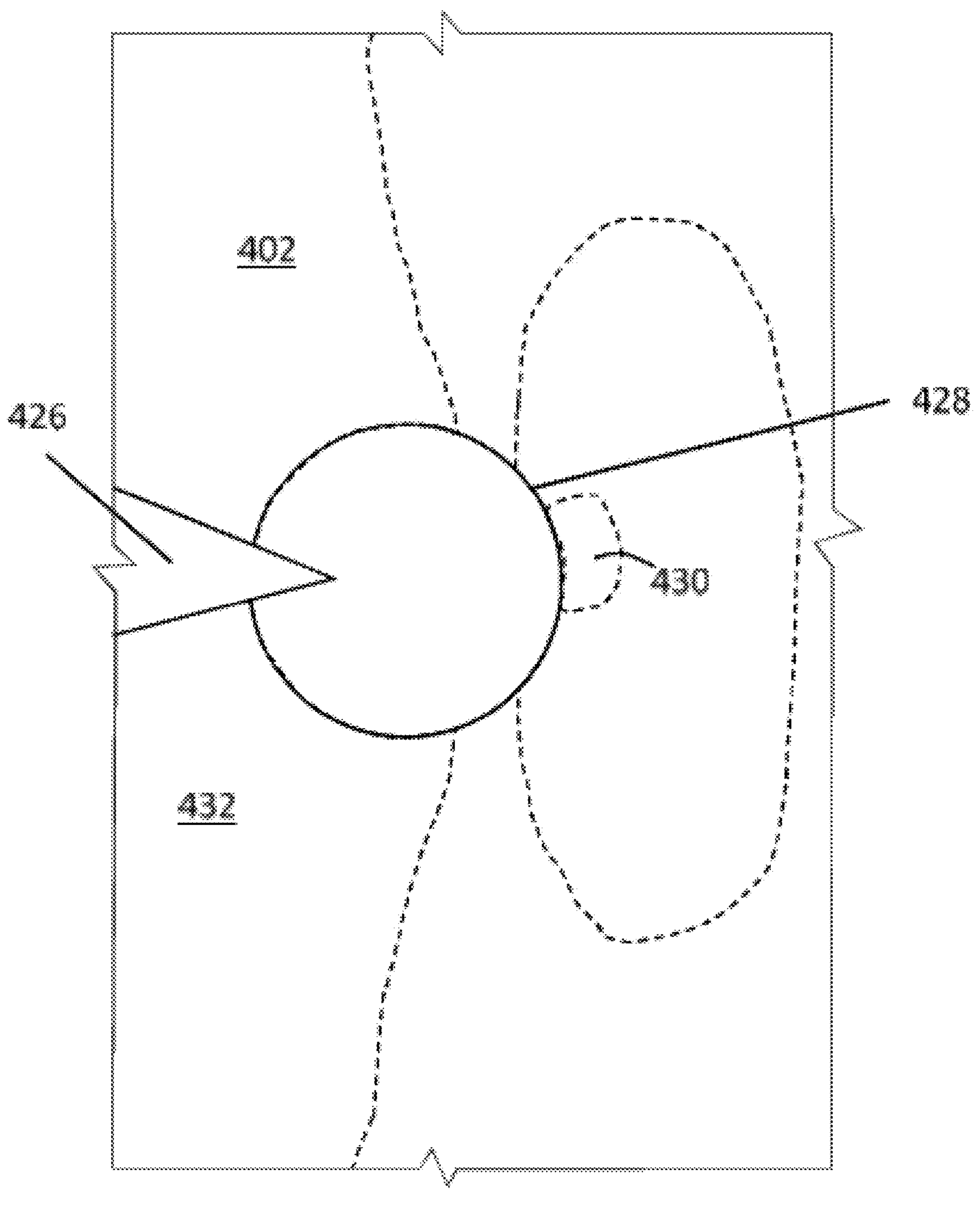
FIG. 4 shows a stress distribution adjacent to a stress-relieving hole at the tip of a scarf joint.

FIG. 4 shows a stress distribution adjacent to a stress-relieving hole at the tip 426 of a scarf joint. The tip 426 of the scarf joint is shown on the left-most side of the drawing, and is triangular. The body 402 occupies the majority of the drawing, and has a hole 428 arranged adjacent to the tip 426 of the scarf joint. The tip 426 of the scarf joint extends approximately halfway along the radius of the hole 428, and thus the tip 426 terminates within the hole 428. The stress distributions around the hole 428 are shown in broken lines, the broken lines representing contours of constant stress, and are relatively uniformly distributed across the portion of the body surrounding the hole 428. The area indicated by reference numeral 430 is an area of higher stress, and the area indicated by reference numeral 432 is an area of lower stress. It will be understood that without the presence of the hole 428, the stress distribution would be highly localized around the tip 426, which may be undesirable if the scarf joint is to tolerate repeated mechanical loads.

The landing gear attachment member 400 of the above described embodiment with its aluminum alloy body 402 and its long fiber aluminum metal matrix composite lug 404 provides the same kind of strength as a titanium landing gear attachment member 400 but using materials that cost significantly less than titanium. The lug can be made, separately from the body of the member, with long fiber aluminum metal matrix composite material in a manner that makes the lug 404 damage tolerant and crack resistant, and thus suitable for use as the lug of such a member. The lug being made primarily of aluminum alloy/aluminum metal matrix composite material can be more readily welded/joined to the body of the member, that being made from aluminum alloy material, something that would be less readily achieved if the combination were to involve joining a titanium lug to a non-titanium body.

Figure 5:
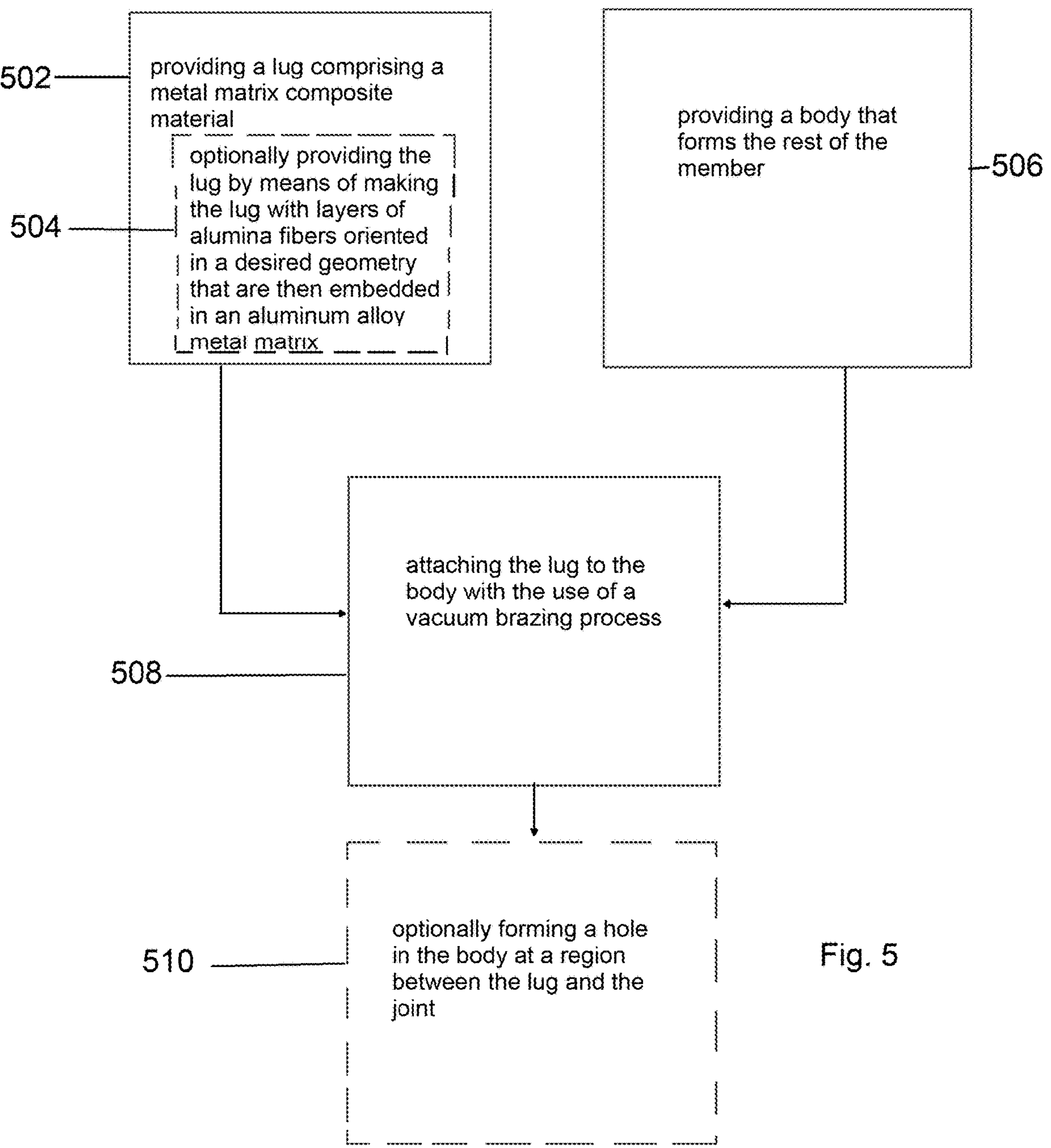
FIG. 5 shows a method of making such a landing gear attachment member.

FIG. 5 is a flow diagram 500 showing a method of making a landing gear attachment member for an aircraft, such as the member mentioned above. The method includes providing (step 502) a lug comprising a metal matrix composite material, optionally (step 504) by means of making the lug with layers of alumina fibers oriented in a desired geometry that are then embedded in an aluminum alloy metal matrix. The method comprises a step (506) of providing a body that forms the rest of the member, the body being formed from wrought forged aluminum alloy. The method comprises a step (508) of attaching the lug to the body with the use of a vacuum brazing process, in which compatible brazing filler material (which may comprise an aluminum brazing alloy) acts to fuse the lug to the body via at least one scarf joint. The brazing alloy is likely to be different from both the material of the body and the material of the lug, although each of the brazing alloy, the body and the lug are likely to be primarily aluminum in composition. The method may further comprise an optional step (510) of forming a hole in the body at a region (where a sharp corner/edge might otherwise exist at a boundary between the lug and the joint) so as to relieve stress that might otherwise arise at the location of the hole. This step could be performed before the step (508) of attaching the lug to the body.

While the present invention has been described and illustrated with reference to particular embodiments, it will be appreciated by those of ordinary skill in the art that the invention lends itself to many different variations not specifically illustrated herein. By way of example only, certain possible variations will now be described.

The member could be fused to the body via a joint not being a vacuum brazed joint. The member could be fused to the body via a joint not being a scarf joint. Fewer or more scarf joints could be used to join the lug to the body. Different materials could be used.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, while of possible benefit in some embodiments of the invention, may not be desirable, and may therefore be absent, in other embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A landing gear attachment member for an aircraft, the landing gear attachment member comprising:

a body comprising metal; and a lug comprising a metal matrix composite, wherein the lug is fused to the body via a joint, wherein the joint comprises a scarf joint, wherein the scarf joint comprises a projection on the lug and a recess on the body, the projection being received within the recess, wherein the body comprises a hole adjacent to a tip of the projection on the lug.

2. The landing gear attachment member according to claim 1, wherein the joint is a brazed joint.

3. The landing gear attachment member according to claim 2, wherein the brazed joint comprises a brazing material located between the body and the lug, the brazing material being different from the metal of the body and the metal matrix composite of the lug.

4. The landing gear attachment member according to claim 1, wherein the body is formed of a material from a group consisting of: aluminum alloy, aluminum metal matrix composite, and homogenous aluminum alloy.

5. The landing gear attachment member according to claim 1, wherein the metal matrix composite comprises one or more reinforcing elements which extend to the joint.

6. The landing gear attachment member according to claim 1, wherein the metal matrix composite comprises one or more reinforcing elements, and wherein the one or more reinforcing elements extend to the tip of the projection on the lug.

7. The landing gear attachment member according to claim 5, wherein the one or more reinforcing elements are alumina fibers.

8. An aircraft comprising the landing gear attachment member of claim 1.

9. An aircraft wing comprising the landing gear attachment member of claim 1.

10. The aircraft wing according to claim 9, further comprising landing gear attached to the landing gear attachment member.

11. A landing gear attachment member for an aircraft, the landing gear attachment member comprising:

a first metal portion comprising a body having an upper surface and a lower surface and a web extending between the upper surface and the lower surface, and a second metal portion comprising one or more lugs, each defining a hole configured to facilitate rotational attachment of a landing gear thereto, the first metal portion being joined to the second metal portion via one or more scarf joints, wherein the one or more scarf joints comprise, respectively, a projection on the one or more lugs and a recess on the body, the projection being received within the recess, wherein the body comprises a second hole adjacent to a tip of the projection on the one or more lugs.

* * * * *